Oct. 2, 1951     O. A. KEEFE     2,569,675
VARIABLE TRANSFORMER
Filed Sept. 9, 1948     7 Sheets-Sheet 1
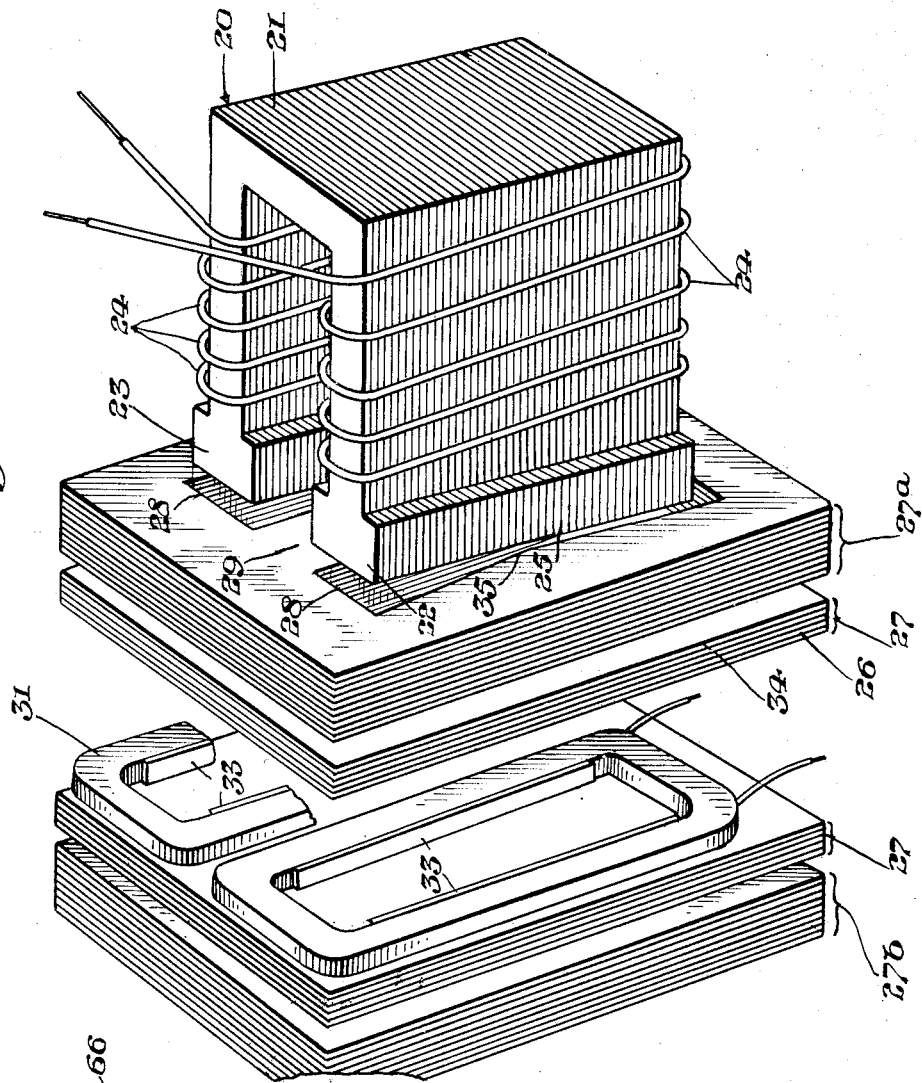
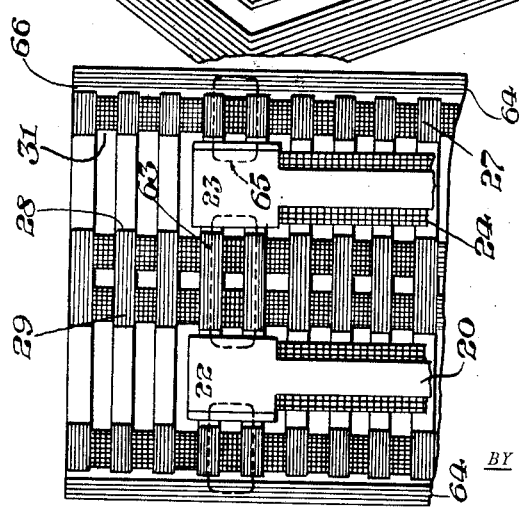
INVENTOR.
Oscar A. Keefe
BY Cousins & Cousins
ATTORNEYS

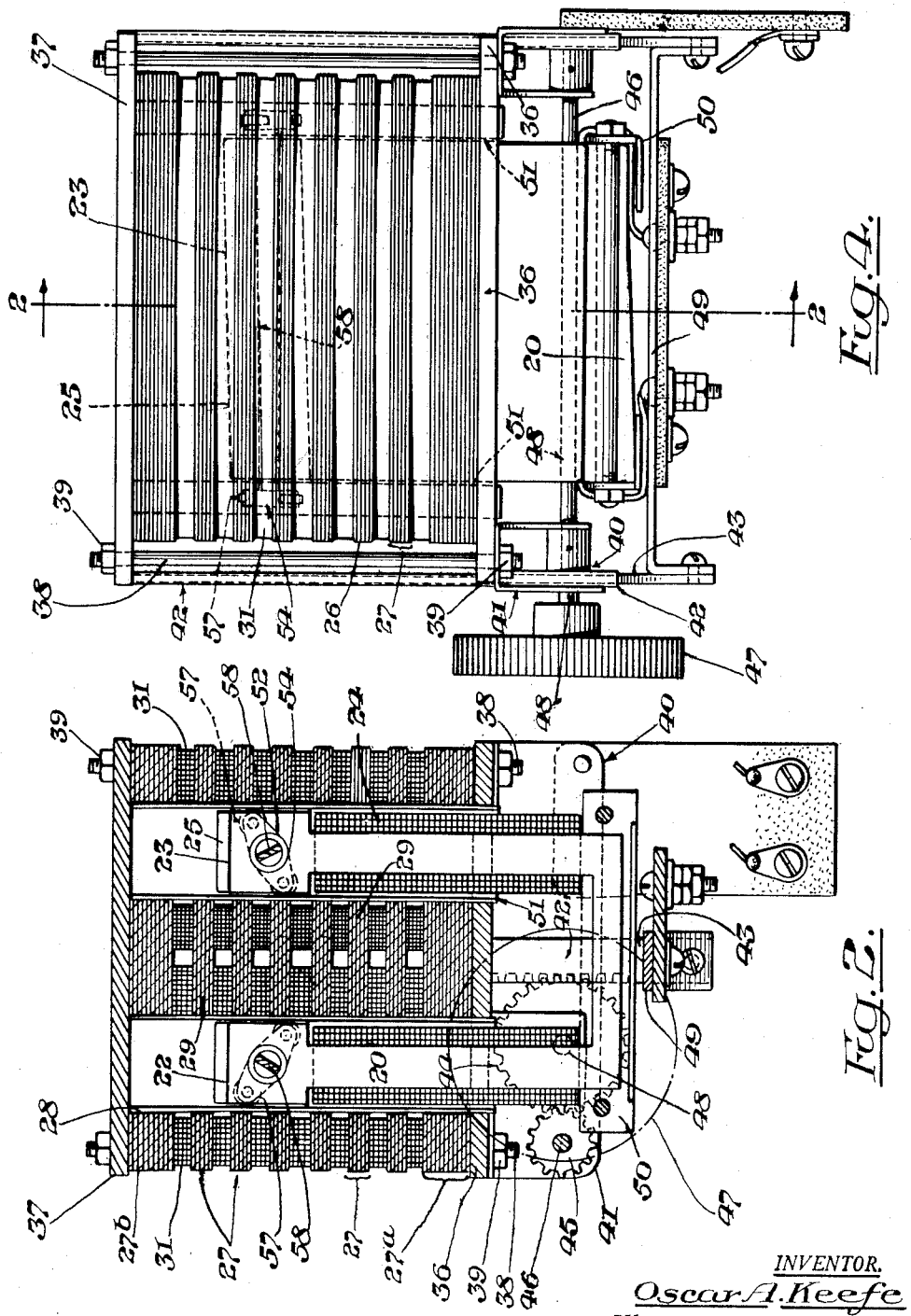

Oct. 2, 1951     O. A. KEEFE     2,569,675
VARIABLE TRANSFORMER
Filed Sept. 9, 1948     7 Sheets-Sheet 3
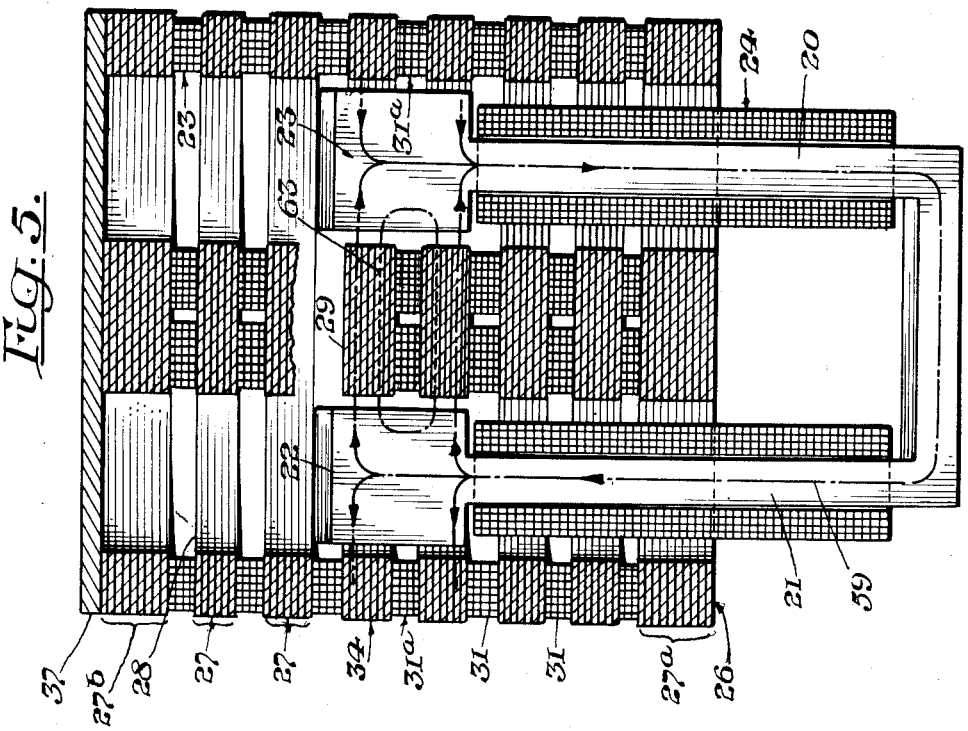
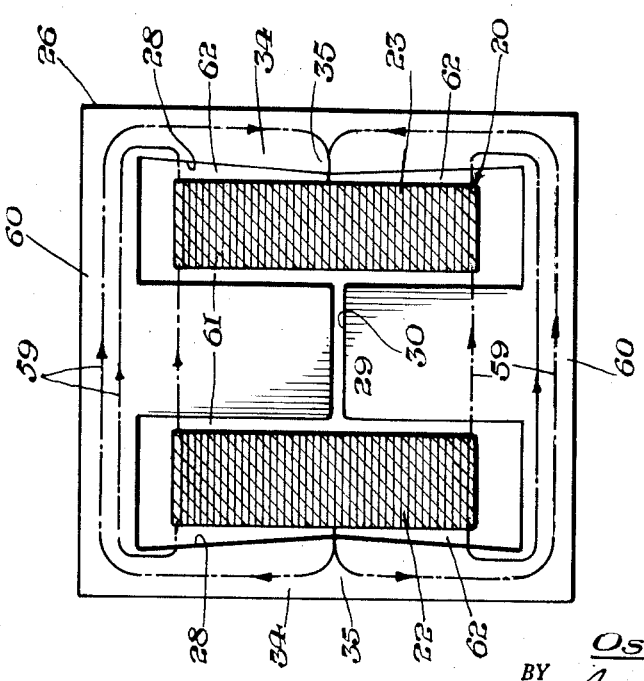
INVENTOR.
Oscar A. Keefe
BY Cousins & Cousins
ATTORNEYS.

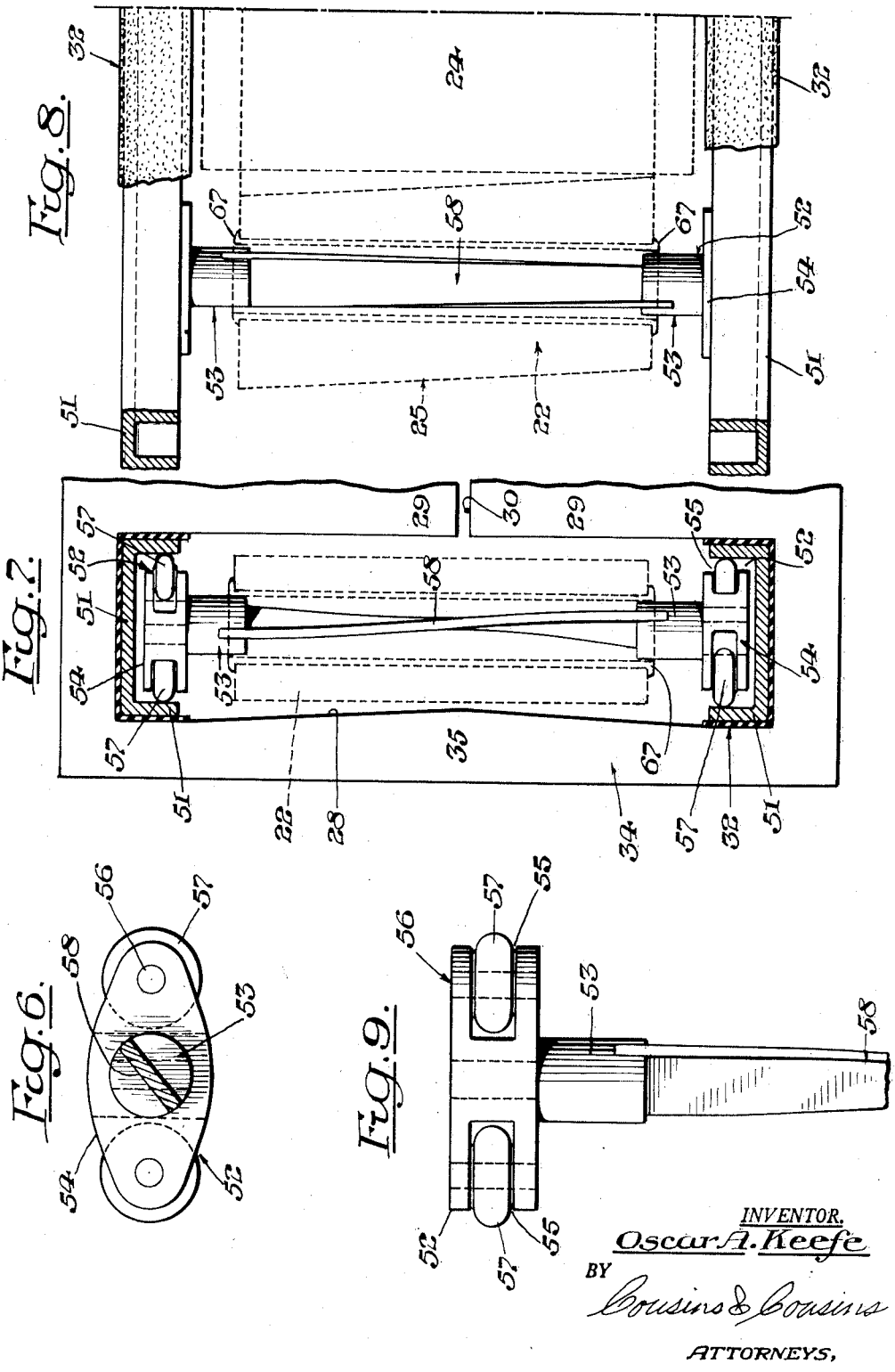

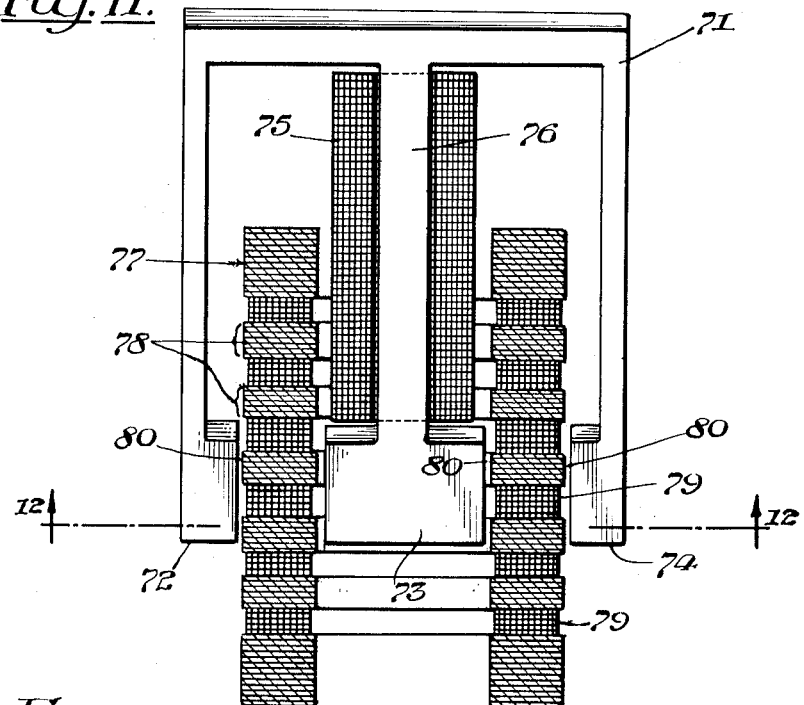
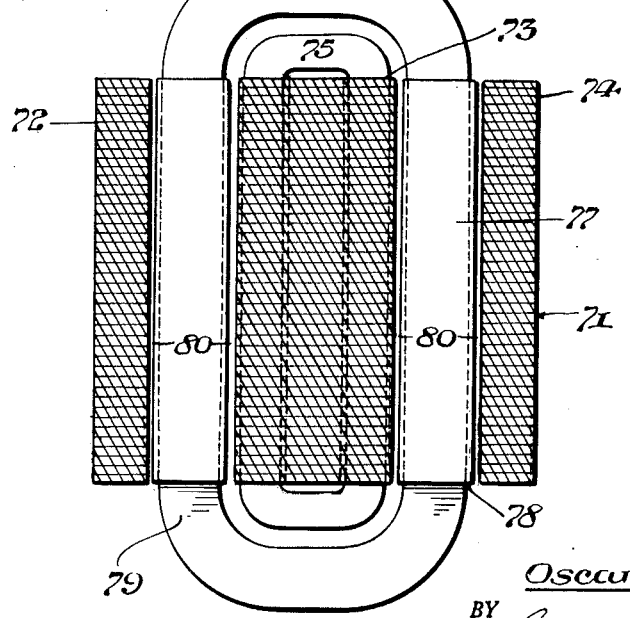

Oct. 2, 1951 — O. A. KEEFE — 2,569,675
VARIABLE TRANSFORMER
Filed Sept. 9, 1948 — 7 Sheets-Sheet 6
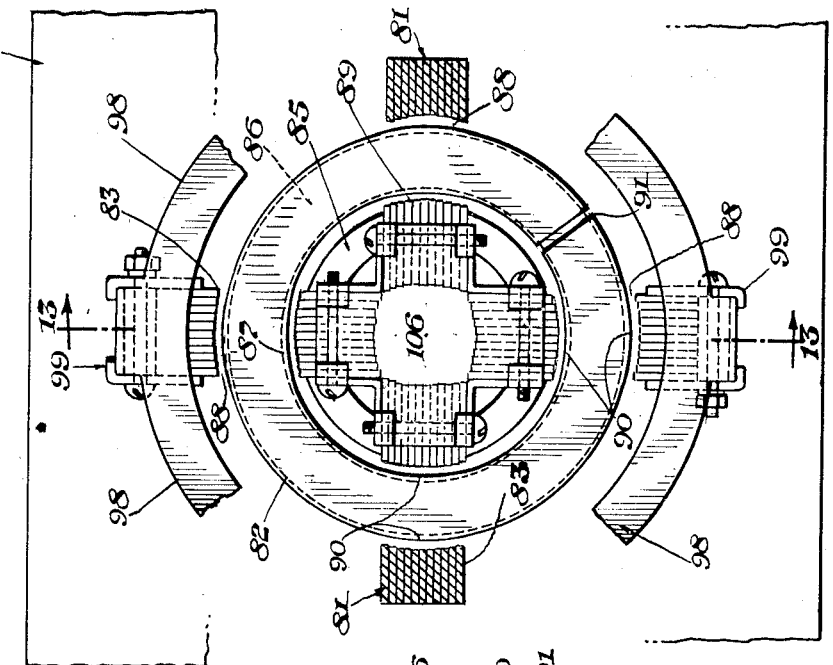
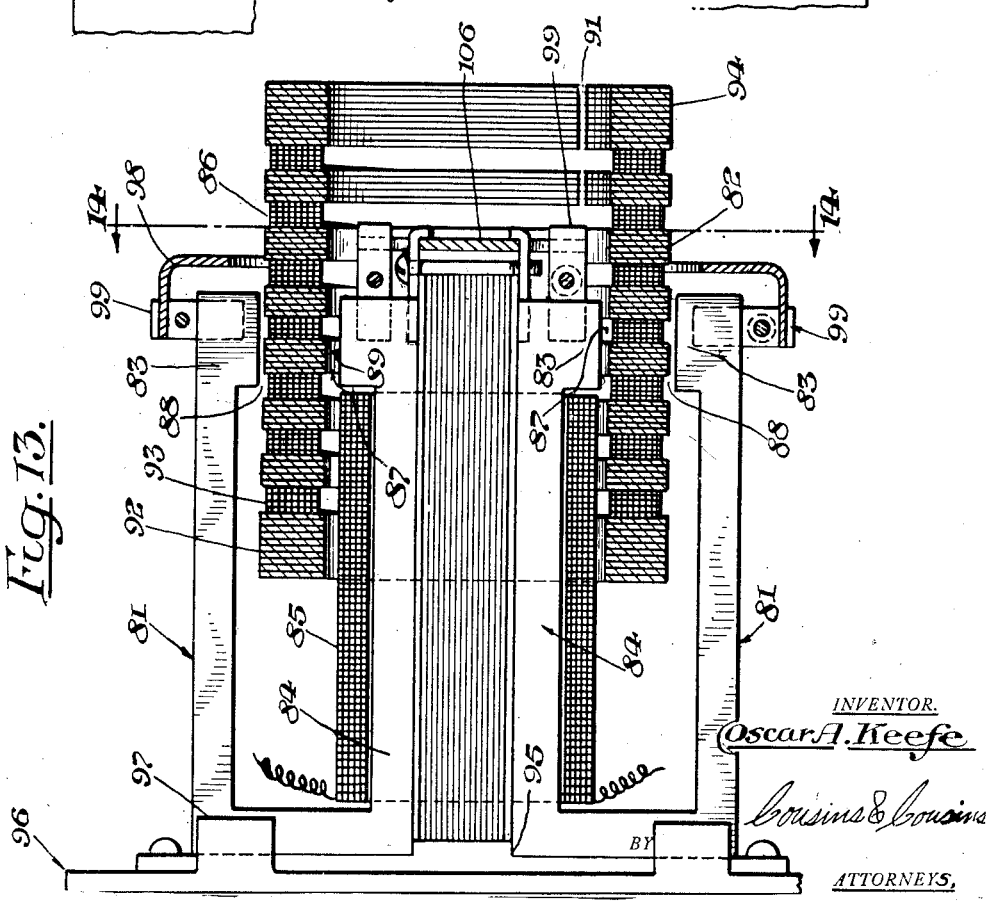
INVENTOR.
Oscar A. Keefe
BY Cousins & Cousins
ATTORNEYS.

Oct. 2, 1951     O. A. KEEFE     2,569,675
VARIABLE TRANSFORMER

Filed Sept. 9, 1948     7 Sheets-Sheet 7

INVENTOR.
Oscar A. Keefe
BY
Cousins & Cousins
ATTORNEYS.

Patented Oct. 2, 1951

2,569,675

UNITED STATES PATENT OFFICE 2,569,675

VARIABLE TRANSFORMER

Oscar A. Keefe, Lincoln Park, N. J.

Application September 9, 1948, Serial No. 48,381

15 Claims. (Cl. 171—119)

This invention relates to transformers, and particularly those that are variable at will as to their transformation ratios.

Presently known variable transformers have their ratio of transformation varied by means of a sliding brush contacting bared turns of the winding. Such sliding contacts present several objectionable features such as: the possibility of overheating the contact, resulting in a burning away of the contact area; abrasion of the winding by the action of the brush; the necessity for replacement and refitting of the brush; and many others.

Where air-gaps have been used heretofore in variable transformers, they have proved to be impractical because of: the large magnetizing current required; the vibration of the parts comprising the air-gaps; the large leakage reactance, especially in the low ratios of transformation, and the large thrust-forces or torques that must be overcome by the control mechanism.

Accordingly, it is an object of this invention to produce a highly practical variable ratio of transformation without sliding contacts, and overcoming the objectionable features listed above.

Another object of this invention is to provide a variable transformer which will allow the use of direct current in the transformer winding coincident with the alternating current without causing magnetic saturation of the core, or in order to control the degree of magnetic saturation of the core.

A further object of this invention is to provide a means for obtaining a great range of variable voltage and current transformation directly without recourse to additional transformers.

The invention consists of the construction, combination and arrangement of parts, as herein illustrated, described and claimed.

In the accompanying drawings, forming part hereof, are illustrated four forms of embodiment of the invention, in which drawings similar reference characters designate corresponding parts, and in which:

Figure 1 is a partially exploded, somewhat diagrammatic, view in perspective of one complete embodiment of the invention, with certain parts omitted or cut away to show more clearly the construction of inner parts thereof.

Figure 2 is a sectional view of the complete embodiment of the variable transformer, shown in Figure 1, taken on line 2—2 of Figure 4.

Figure 3 is a plan view of the secondary core with the primary poles shown in section therein.

Figure 4 is a side elevation of the complete embodiment of the variable transformer shown in Figure 2, according to this invention.

Figure 5 is a somewhat enlarged and diagrammatic view of the section shown in Figure 2, with certain parts omitted for the sake of clarity.

Figure 6 is an enlarged side elevation of a guide roller used in the control mechanism, in accordance with this invention.

Figure 7 is a plan view of the guide mechanism for one salient pole, somewhat enlarged.

Figure 8 is an enlarged view in side elevation of the guide mechanism.

Figure 9 is an enlarged plan view of one guide roller and a portion of the connecting flat spring.

Figure 10 is a fragmentary vertical section of the secondary stacks of the variable transformer, showing an alternate form of construction for controlling flux leakage.

Figure 11 is a somewhat diagrammatic view in vertical section of a second embodiment of this invention.

Figure 12 is a sectional view of the transformer shown in Figure 11, taken on line 12—12.

Figure 13 is a somewhat diagrammatic view in vertical section of a third embodiment of a variable transformer, according to this invention.

Figure 14 is a sectional view of the transformer shown in Figure 13, taken on line 14—14, looking in the direction indicated by the arrows.

Figure 16:
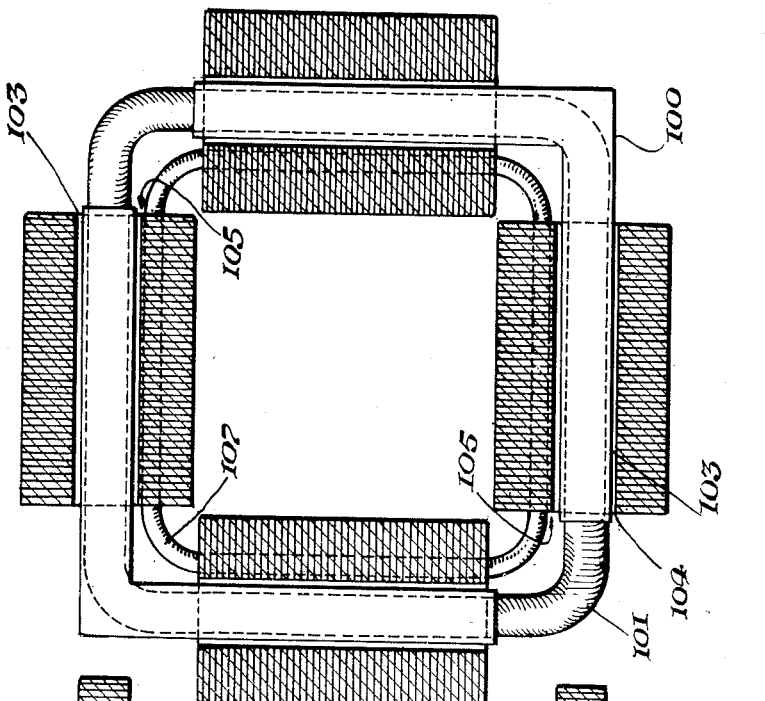
Figure 16 is a sectional view of the transformer shown in Figure 15, taken on line 16—16, looking in the direction indicated by the arrows.

Referring to the drawings, and particularly to Figure 1, 20 indicates a substantially U-shaped primary core made up of a plurality of magnetic laminations 21. The core 20 terminates in salient poles 22, 23. The core 20 is provided with a winding 24 on each leg thereof. These windings 24 may be connected in series aiding or in parallel-aiding to provide excitation for the core 20. The windings 24, hereinafter referred to as the primary windings, are connected to a source of alternating voltage supply (not shown). The laminations 21 comprising the core 20 are skewed along the poles 22, 23, as indicated at 25 and for a hereinafter described purpose.

A plurality of magnetic laminations 26 are assembled in stacks 27 (see Figures 2 and 3) to form a structure hereinafter called the secondary stacks. The magnetic laminations 26 are rectangular in shape and are provided with openings or windows 28. The lamination tongues are designated by the reference numeral 29; the sides by 34; the ends by 60, and a gap 30 in the tongue, to prevent the laminations from acting as shorted turns about the primary coil 24. The said windows 28 are in alignment so as to provide openings in the secondary stacks 27 through which the primary core 20 may telescopically enter.

Two groups of coils 31 are located between the secondary stacks 27. These coils 31, best shown in Figures 1, 2 and 5, are hereinafter referred to as pie coils. The position and shape of the pie coils 31 are such that they permit the primary core 20 and primary windings 24 to pass therethrough without interference. The pie coils 31 may be connected in series-aiding, series-parallel, or combinations of some coils in aiding and some in opposition, or grouped to provide more than one secondary winding, or each to provide an individual secondary winding. The pie coils 31 thus constitute the secondary winding or windings of the transformers.

In the preferred embodiment of this invention the coils 31 are insulated from the magnetic laminations 26 by a suitable insulating winding form or insulating tape (not shown). Nonmagnetic spacer plates 33 (see Fig. 1) may also be provided between the stacks 27 to prevent them from distorting the pie coils 31 when the stacks and coils are clamped in assembly.

While the magnetic laminations shown in Figures 1, 2, 3, 4 and 5 are completely closed in shape, they might well be E-shaped without departing from the spirit of this invention. The use of E-shaped laminae may be more economical to manufacture, but are not preferred from the standpoint of rigidity.

Referring again to Figure 3, it will be seen that the sides 34 of the secondary laminations 26, which are parallel with the longitudinal axis of the windows 28, have been uniformly widened at the center, as indicated at 35, for a hereinafter described purpose. Since the salient poles 22, 23 are of equal width throughout, there is thus provided an air-gap 62 between the outer edge of the poles 22, 23 and the inner edge of the sides of the adjacent stacks 27, which decreases in length uniformly toward the center of the windows 28.

The remaining structure required to assemble and operate the embodiment of the instant invention shown in Figures 2 and 4, comprises clamping means to hold the stacks 27 and the coils 31 together; a control mechanism for varying the position of the primary with respect to the secondary of the transformer, and guide means for the travel of the primary core within the secondary stacks.

The clamping means may consist of a bottom plate 36, cut to conform to the shape of the secondary laminations and drilled at the corners thereof. A top plate 37 is provided to overlie the entire stack of secondary laminations 26. The top plate 37 is drilled at the four corners thereof, identical to the bottom plate. The tie rods 38 extend alongside of the stacks 27 and pass through the bottom and top plates 36 and 37. Nuts 39 or suitable fastening means are then threaded upon the rods 38 thereby rigidly clamping the stacks 27 and coils 31 between the plates 36, 37.

The control mechanism 40 for varying the position of the primary with respect to the secondary of the transformer, is shown at the bottom of the embodiment illustrated in Figures 2 and 4. This mechanism is secured to the bottom plate 36 by two angle members 41. Secured to the middle of each angle member 41 and extending normal thereto, are two guide members 42.

Each guide 42 slidably carries a gear rack 43 therein. The teeth of each gear rack 43 are in mesh with a spur gear 44, carried by the angle members 41. Each spur gear 44 is in mesh with one of the pinions 45 mounted upon a common shaft 46 and spaced slightly from each end thereof. The shaft 46 is journaled within the angle members 41. A control knob 47 is carried by a small shaft 48 at the left of the control mechanism 40. The shaft 48 also carries the left hand spur gear 44. Rotation of the control knob 47, therefore, will cause both gear racks 43 to be raised or lowered within the guides 42. By the simple expedient of joining the lower ends of the racks by a bar 49 and securing the said bar 49 to the clamp 50 which holds together the U-shaped laminations of the primary core, there is provided control means for varying the respective positions of the primary and secondary windings.

Guide means are required to maintain the distance between the poles 22, 23 of the primary core 20 and the laminations 26 of the secondary, throughout the range of telescopic action. A preferred form of such guide means is shown in Figures 2, 4, 6, 7, 8 and 9. The guide means comprises four non-magnetic channel members 51, two of which are assembled in each of the windows 28, as shown in Figures 2, 4, 7 and 8. The channel members 51, if made of metal, are electrically insulated from all metallic parts, such as the secondary stacks 27, in order not to form a shorted turn about the primary winding 24, by the use of a dielectric foil 32. Riding within these channel members 51 are two roller assemblies 52, best shown in Figures 6, 7, 8 and 9. These roller assemblies are carried by sleeves 57 thrust through holes in the poles 22, 23 and comprise two shafts 53 having a block 54 at one end thereof. The sleeves 57 are suitably insulated from the laminations of the core 20.

The blocks 54 are bifurcated at each end as indicated at 55. Within each bifurcation 55 there is carried, upon a small shaft 56, a freely rotatable roller 57. The position of the blocks 54 upon each shaft 53 is such that the longitudinal axes thereof are offset with respect to one another (see Figure 7). The shafts 53 are provided with a flat spring therebetween, as indicated at 58. In order to insert the primary core 20 within the secondary stacks 27, it is necessary to distort the spring 58 by application of a torque at both ends until both sets of rollers fit into the channels 51, thus, when the distorting torque is removed, imparting a pre-loading to the rollers 57 in the channels 51. This pre-loading insures that the primary core 20 will maintain its spacing with the secondary laminations 26 at all times and be free from vibration, while at the same time the core 20 can move freely into and out of the secondary stacks.

Referring to Figures 3 and 5, it will be seen that the magnetic circuit 59 for the primary winding 24 is completed from one pole 22 to the other pole 23, via the tongues 29 and air gaps 61, and in a parallel path by way of the sides 34 of the stacks 27, air gaps 62 and the ends 60 of the said stacks. The magnetic circuit 59, as shown in Figures 3 and 5, passes from the pole 22 only through those particular portions of the secondary stacks which are in juxtaposition to the faces of the pole 22, and thence to the pole 23 by way of the air gaps 61, 62. The air gaps 61 are uniform in width and cross-sectional area throughout. The extremities of the air gaps 62, however, between the poles 22, 23 and the sides 34 of the stacks 27, are of shorter length (in the direction of the flux) than that of the uniform gaps 61, and the length of the gaps 62 decreases uniformly toward the midpoint thereof due to the widening of the sides 34, as shown at 35. By reason of this construction the flux densities in each gap 61, 62 are made equal in value and uniformly distributed, inasmuch as the increased magnetic reluctance of the longer branch paths (the sides 34 and ends 60) are compensated for by a magnetically equivalent shortening of the air gap in such paths. The degree of shortening can be calculated by the usual method of equating mmfs. of the various paths under the imposed condition that the flux density in all air gaps is the same at all points.

Referring to Figure 5, it will be seen that the faces of the poles 22, 23 bordering upon the gaps 61, 62 are formed so as to span two of the stacks of laminations 27 and the pie coils 31 therebetween. Spanning more than one stack, in this manner reduces the magnitude of the step-like variation of magnetic reluctance of the air gaps 61, 62 as the salient poles 22, 23 move past the stacks 27. A still further reduction in the step-like variation is achieved by reason of the previously described skewed construction of the poles 22, 23. This skewing causes the pole faces to span the distance between the stacks diagonally, as indicated by the dotted lines in Figure 4.

An examination of Figure 5 will show that all of the pie coils 31 below the poles 22, 23 are effectively linked with the magnetic circuit 59, of the primary winding 24. Thus the magnetizing flux, as shown by the path of the flux 59 passes through these coils 31, practically as though they were actually wound upon the windings 24 of the primary. The coils 31 above the poles 22, 23 are entirely out of the path 59 of the magnetizing flux. The coils 31a which happen to be opposite the faces of the poles 22, 23 and which are thereby sandwiched between secondary stacks 27 through each of which only a portion of the magnetizing flux 59 flows, are partially linked with the primary winding 24. Thus, as the stacks 27 are traversed by the poles 22, 23 from the bottom to the top, flux linkage of the primary with the secondary winding coils 31 is varied from none at all, when the poles 22, 23 face the bottom stacks 27a, to full linkage, when the poles 22, 23 face the topmost stack 27b. Accordingly, the induced voltage in the secondary winding is varied from zero to full voltage. Due to the fact that the pie coils 31 above the poles 22, 23, which do not contribute to the induced secondary voltage, have magnetic circuits largely in air, they will contribute little to the leakage reactance of the transformer.

An air gap in the core of a transformer ordinarily greatly increases the value of the magnetizing current. This feature is highly undesirable for reasons well known in the transformer industry. However, in the present invention, the increase in magnetizing current has been limited satisfactorily without objectionably increasing the size or bulk of the core. This result has been accomplished by using a value of flux density in the air gaps 61, 62 much lower than that in the primary core 20. Since the relative flux density in an air gap will be inversely proportional to the relative areas of cross-section of the gap and the core, the thickness of each secondary stack 27 is made equal to the width dimension of the primary core 20. Thus, when the two stacks are spanned by the pole faces (see Figure 5), the cross-sectional area of the air gap is twice that of the core structure, and, since the flux 59 in the core divides into two equal parts in each stack at the poles, as shown in Figure 5, the flux density in each of the gaps 61, 62 is one-fourth that in the core.

Another objectionable feature which arises in a magnetic circuit having an air gap and a magnetic element free to move therein, is vibration and noise. The vibration results from the action of the strong alternating magnetic field upon the movable element tending to close the air gap. This objectionable vibration is satisfactorily minimized in the present invention by the symmetrical nature of the construction of the magnetic elements and the balancing of the magnetic forces therein against each other. Thus the forces in the air gaps 61, 62 due to flux 59 are so disposed that they are opposite in direction on the poles 22, 23 and of equal strength (see Figures 3 and 5), thereby cancelling each other. The corresponding forces in the secondary stacks 27 which would tend to pull the sides 34 together, are resisted by the rigidity of the construction of the stacks 27.

The forces produced in the air gaps 61, 62 by the magnetizing and secondary leakage fluxes (which latter will be described hereinafter) are transverse to the direction of movement of the core structure 20 when actuated by the control mechanism 40, and, therefore, they have no appreciable components of thrust in this direction. The magnetic fluxes of those coils 31 which are outside of the primary core structure 20 (above the poles) are not only of relatively low density, but are cut off from interacting with the primary coils 24 by the substantially closed magnetic circuit of the core structure 20 and the secondary stacks 27 therebetween. Those coils 31 below the poles, and linking the mutual flux, approach more nearly that position of axial symmetry with the primary coil 24, where the axial repulsive forces are nil, as the number of linked secondary coils 31 is increased. Thus the axial repulsion between the coils 24 and 31 is relatively limited in intensity and is readily held in check by the control mechanism.

The effect of the leakage flux in the air gaps is also important in the problem of avoiding unbalanced forces of vibration. Figure 5 shows the path 63 of the leakage flux due to the two pie coils 31a sandwiched between the two stacks 27 carrying the magnetizing flux. No direction arrows have been applied to the path 63, as this flux has a variable phase relationship to the magnetizing flux 59. No leakage-flux paths are shown in the air gaps 62 because the small values of leakage-flux densities in these gaps 62, render the forces in them generally unimportant. In the type of transformer shown in Figures 1 to 5, the force of the leakage flux 63 is minimized by using a relatively small percentage of secondary turns in each pie coil 31, as compared to the whole winding. The vibrational effect of the leakage-flux force is minimized by mechanically constraining the poles 22, 23 in the lateral direction while allowing free up and down motion of translation.

A method of bringing the forces of the leakage-flux 63 into equilibrium in the poles 22, 23 within the concept of this invention, is shown in Figure 10. In this construction two additional stacks of magnetic laminations 64 and air gaps 66 bridge the outer air spaces between all the secondary stacks 27. The laminations 64 augment the leakage-flux 65 about the sandwiched pie coils 31a in particular, without unduly increasing the leakage reactances of the other pie coils. The air gaps 66 are rigidly maintained constant by mechanical means in order to prevent vibration of the laminations 64 by reason of the forces in the gaps 66.

The forces due to the leakage-flux 65 in the air gaps 62, which were previously ignored, being now augmented, will directly oppose the leakage-flux 63 forces in the gaps 61. By the proper adjustment of the lengths of the air gaps 66, the leakage-flux forces may be brought into equilibrium in the poles 22, 23, and all vibration of the said poles 22, 23 eliminated or minimized. It is within the purview of this invention to reduce the size of the laminations 64 so that they span only two stacks at a time. The said laminations 64 could then be moved in the same manner as the poles 22, 23.

While the drawings and accompanying description have been confined to a single phase variable transformer, it is within the purview of this invention to add another arm, pole and winding thereon to the primary core, making it substantially E-shaped, and a third window and groups of pie coils to the secondary core described herein, and thereby use the said transformer in three-phase installations. However, for the sake of a simplified exposition, the specification will be restricted to the single phase construction.

The previously described construction is readily used as a variable reactor. In this use, ordinarily, the primary winding 24 is not needed and may be omitted without further changes in the structure. However, the winding may be retained and supplied with direct current for control of the magnetic saturation of the reactor. As a reactor, connection is made to the secondary winding, that is, to the groups of pie coils 31 which then become the magnetizing winding. The coils 31 below the poles 22, 23 (see Figure 5) when energized, cause fluxes to flow in substantially the same paths as did the current in the primary coils 24. The pie coils 31 above the poles are not linked with the core structure 20. The coils 31a which are sandwiched in the air gap 61 are partially linked by the poles 22, 23, as shown in Figures 5 and 10. The coils 31 which do link the core have, by virtue of the low reluctance of the core's magnetic circuit, a relatively high inductance. Those coils 31 which do not link with the core 20 have magnetic paths which are largely in air, and thus have a low inductance. Thus, as the stacks 27 are traversed upwardly by the poles 22, 23, the inductance and reactance of the groups of coils 31 are varied from relatively low values (comparable to those of air coils) to relatively high values (similar to coils with magnetic cores and small air gaps.

Another embodiment of the variable transformer, according to this invention, is shown in Figures 11 and 12. In these figures the reference numeral 71 indicates the laminated primary core structure having three salient poles 72, 73, 74. A single primary winding 75 is provided about the tongue 76 of the core 71. The laminations 77 of the secondary stacks 78 are of simple rectangular shape, and the stacks are aligned as before. Only one group of pie coils 79 is required. This group of coils 79 comprises the secondary winding of this embodiment of the transformer. The pie coils 79 may be connected in series or in other suitable arrangements, as previously set forth. The magnetic circuit of the primary core structure 71 is substantially closed, as before, by those secondary stacks 78 which are in the gaps 80. The manner in which the induced voltage may be varied in the embodiment is the same as that described in connection with the previous structure, shown in Figures 1 to 5.

The air gaps 80 in this variation of the transformer, are all of the same length in cross-sectional area. The forces in these gaps, acting upon the pole 73 and those stacks 78 which are in the air gaps and resulting from the magnetizing and leakage-fluxes are therefore in equilibrium. The unbalanced forces on the poles 72 and 74 cause no vibration effects because of the rigidity of the core clamping assembly (not shown). There is, therefore, no need for compensation as to the relative lengths of the air gaps such as was previously described. The laminations of the primary core 71, however, are skewed as described above, and for the same purpose.

A third embodiment of the variable transformer, according to this invention, is shown in Figures 13 and 14, in which 81 indicates four U-shaped primary core stacks. These stacks 81 are secured and arranged at right angles to each other so as to allow the entrance of the circular secondary stacks 82, 92, 94, between the pairs of poles 83 thereof. Each primary stack 81 may have its own primary winding on one or both of its legs 84, or alternatively, one leg 84 of each stack may be linked with the others by a common primary winding 85, as shown in Figure 13. The pie coils 86, 93 held between the stacks 82, 92, 94, constitute the secondary winding and may be connected in any manner or combination, as described above in discussing the foregoing embodiments. The magnetic circuit of each primary stack in this embodiment is substantially closed from one pole 83 to the other by the secondary stacks 82 between the said poles 83.

The air gaps 87, 88 between the poles 83 and the secondary stacks 82 are of slightly different length. Due to the difference in the radii of the inner and outer pole faces 89, the surface area of the gap 87 will be slightly greater than that of gap 88. In order to make the forces in both gaps 87, 88 equal, the length of the gap 87 is made shorter than that of the gap 88 by a suitable amount. Also, in order to obtain a uniform length of gap between the surfaces of the gaps 87, 88, the inner and outer peripheries of the secondary laminations 82 are bulged outwardly away from the true circle throughout the width of each primary stack 81, as indicated at 90 in Figure 14. An air gap 91 in the secondary laminations 82 is necessary to prevent the said laminations from acting as shorted turns about the coil 85.

When the end stack 92 is between the poles 83, and the adjacent pie coil 93 is out of the path of the magnetizing flux produced by the primary coil 85, that is, outside of the poles 83, the induced voltage in the secondary coils 93, 86 will be at a minimum or zero. As the rigid structure of the secondary coils 93, 86 and stacks 92, 82, 94 is telescoped into the air gaps 87, 88 of the primary cores 81, the induced secondary voltage will increase until it reaches a maximum when the outer end stack 94 is between the poles 83, and all the pie coils 93, 86 are entirely within the primary stacks 81.

The primary stacks 81 may be staggered an amount more or less equal to the space between stacks 82, in diametric pairs, as indicated at 95, in order to reduce the step-variation in flux linkages. Alternatively, the individual laminations of each stack 81 may be skewed longitudinally in the same manner as in the prior embodiments, shown there as 25, in Figure 4. It is necessary in this construction to rigidly secure the primary stacks 81 to prevent vibration.

For this purpose a mounting plate 96 is provided and each of the stacks 81 is secured thereto as by clamps (shown in Figure 13 but omitted from Figure 14 for clarity). The inner poles 83 are rigidly fastened together by a plate 106 (see Figure 13) to which each inner pole is secured by two clamp bars 99. The outer poles 83 are rigidly fastened together by a ring-shaped plate 98, to a formed lug of which each outer pole is secured by two clamp bars 99a.

Figure 15:
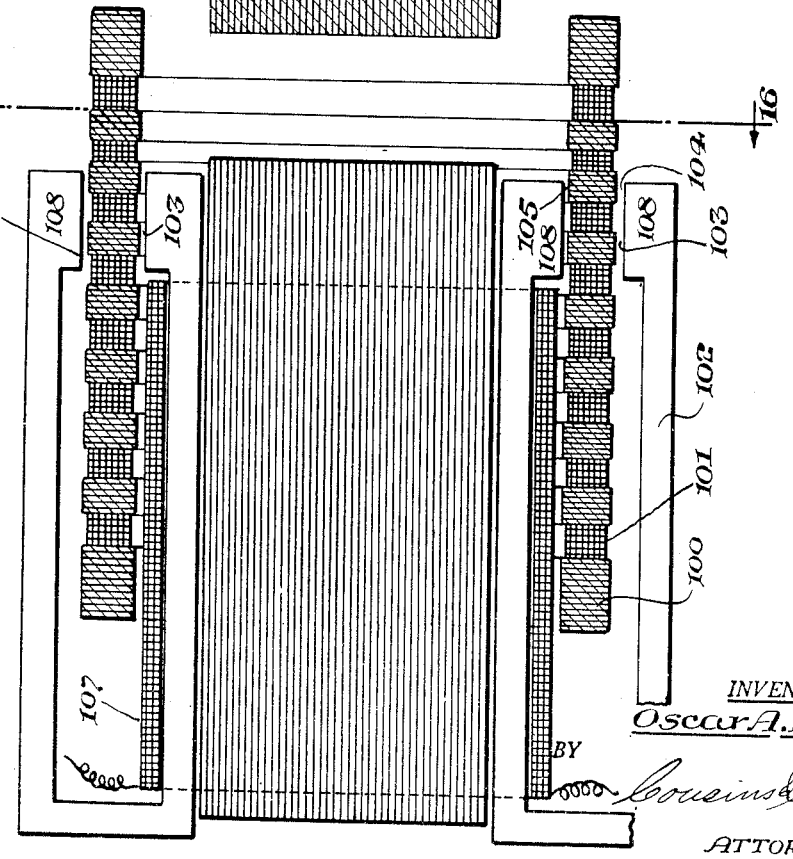
Figure 15 is a somewhat diagrammatic view in vertical section of a fourth embodiment of a variable transformer, according to this invention.

A fourth embodiment of the variable transformer, according to this invention, is shown in Figures 15 and 16. Referring to the said drawings, 100 indicates a series of secondary lamination stacks between which are placed a group of pie coils 101, as shown. The pie coils 101 have been given a substantially square-ring shape in this structure. The laminations of the secondary stacks 100 may be of simple rectangular shape with one group of such stacks provided for each of the primary core stacks 102. The stacks 100 may be combined, if desired, for mechanical convenience, by making the laminations L shaped, as shown in Figure 16.

Another form of secondary lamination (not shown) combines all four groups of secondary stacks 100 by using a square ring form of lamination and providing an air gap therein to prevent the stacks forming a shorted turn about the primary winding 107. The pole faces 103 in the embodiment shown in Figures 15 and 16 are plane surfaces of equal areas, thus the magnetic forces in the gaps 104, 105 are in equilibrium in the poles 108 when the gap lengths are all equal. The primary core stacks 102 may be staggered, or the laminations thereof skewed, as described above in connection with the other embodiments of this invention.

Having thus fully described the invention, what is claimed as new and desired to be secured by Letters Patent of the United States, is:

1. A variable transformer comprising, a magnetic primary core having salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

2. A variable transformer comprising, a magnetic primary core having two salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

3. A variable transformer comprising, a magnetic primary core having two salient poles thereon and an air gap between the poles, a primary winding on the said core, a secondary coil structure comprising a pair of laterally spaced coils, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

4. A variable transformer comprising, a magnetic primary core having three salient poles thereon and air gaps between the poles, a primary winding on the said core, a secondary coil structure, a plurality of mutually spaced magnetic bridging members bridging said air gaps and disposed so as to sandwich the secondary coil structure therebetween, said magnetic bridging members and secondary coil structure having openings therein to receive telescopically the poles of the primary core and means to vary telescopically the relative positions of the primary core poles and bridging members.

5. A variable transformer comprising, a magnetic primary core having three salient poles thereon and air gaps between the poles, a primary winding on the said core, a secondary coil structure comprising a pair of laterally spaced coils, a plurality of mutually spaced magnetic bridging members bridging said air gaps and disposed so as to sandwich the secondary coil structure therebetween, said magnetic bridging members and secondary coil structure having openings therein to receive telescopically the poles of the primary core and means to vary telescopically the relative positions of the primary core poles and bridging members.

6. A variable transformer comprising, a substantially U-shaped magnetic primary core having salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

7. A variable transformer comprising a substantially E-shaped magnetic primary core having salient poles thereon and air gaps between the poles, a primary winding on the said core, a secondary coil structure, a plurality of mutually spaced magnetic bridging members bridging said air gaps and disposed so as to sandwich the secondary coil structure therebetween, said magnetic bridging members and secondary coil structure having openings therein to receive telescopically the poles of the primary core and means to vary telescopically the relative positions of the primary core poles and bridging members.

8. A variable transformer comprising a magnetic primary core formed from a plurality of U-shaped members having salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

9. A variable transformer comprising, a magnetic primary core having salient poles thereon and an air gap between the poles, a primary winding on the said core, a secondary coil structure, a plurality of substantially rectangular, mutually spaced magnetic bridging members bridging said air gap and disposed so as to sandwich the secondary coil structure therebetween, said magnetic bridging members and secondary coil structure having openings therein to receive telescopically the poles of the primary core and means to vary telescopically the relative positions of the primary core poles and bridging members.

10. A variable transformer comprising, a magnetic primary core formed from a plurality of U-shaped members having salient poles thereon and air gaps between the poles, a primary winding on the said core, a substantially ring shaped secondary coil structure, a plurality of substantially ring shaped, mutually spaced magnetic bridging members bridging said air gaps and disposed so as to sandwich the secondary coil structure therebetween, said magnetic bridging members and secondary coil structure having a width such that said bridging elements and coils may slide between the said salient poles and means to vary telescopically the relative positions of the primary core poles and bridging members.

11. A variable transformer comprising, a magnetic primary core formed from a plurality of U-shaped members radially disposed to one another having salient poles thereon and air gaps between the poles, a primary winding on the said core, a secondary coil structure, a plurality of mutually spaced magnetic bridging members bridging said air gaps and disposed so as to sandwich the secondary coil structure therebetween, said magnetic bridging members and secondary coil structure having openings therein to receive telescopically the poles of the primary core and means to vary telescopically the relative positions of the primary core poles and bridging members.

12. A variable transformer comprising a magnetic primary core having salient poles thereon and an air gap between the poles, a primary winding on the said core, a secondary coil structure comprising a plurality of spaced pie coils, a plurality of mutually spaced magnetic bridging members bridging said air gap and disposed so as to sandwich the pie coils of the secondary coil structure therebetween, said magnetic bridging members and secondary coil structure having openings therein to receive telescopically the poles of the primary core and means to vary telescopically the relative positions of the primary core poles and bridging members.

13. A variable transformer comprising, a magnetic primary core having salient poles thereon and an air gap between the poles, a primary winding on the said core, a substantially ring shaped secondary coil structure, a plurality of substantially split, mutually spaced magnetic bridging members bridging said air gap and disposed so as to sandwich the secondary coil structure therebetween, said magnetic bridging members and secondary coil structure having a width such that said bridging elements and coil structure may slide between the said salient poles and means to vary telescopically the relative positions of the primary core poles and bridging members.

14. A variable transformer comprising, a magnetic primary core having salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and means consisting of gear racks disposed at either side of the transformer and coupled to the primary core and a knob-responsive gear train to raise and lower the said gear racks to vary telescopically the relative positions of the primary core poles and bridging members.

15. A variable transformer comprising, a magnetic primary core having salient poles thereon and an air gap between the poles, a primary winding on the said core, a secondary coil structure, a plurality of mutually spaced magnetic bridging members bridging said air gap and disposed so as to sandwich the secondary coil structure therebetween, said magnetic bridging members and secondary coil structure having openings therein to receive telescopically the poles of the primary core and the windings on said primary core and means to vary telescopically the relative positions of the primary core poles and bridging members.

OSCAR A. KEEFE.

REFERENCES CITED

The following references are of record in the file of this patent:

UNITED STATES PATENTS

| Number | Name | Date |
|---|---|---|
| 511,742 | Wotton | Dec. 26, 1893 |
| 1,431,627 | Bristol | Oct. 10, 1922 |
| 1,525,563 | Baker | Feb. 10, 1925 |
| 1,528,686 | Neumann | Mar. 3, 1925 |
| 1,671,106 | Fisher | Mar. 29, 1926 |
| 2,018,626 | Polydoroff | Oct. 22, 1935 |
| 2,254,309 | Perry | Sept. 2, 1941 |